Patented Apr. 13, 1943

2,316,274

UNITED STATES PATENT OFFICE 2,316,274

COATING AND PRODUCTION OF COATED STRUCTURES

James A. Mitchell, Kenmore, N. Y., assignor to E. I. du Pont de Nemours & Company, Wilmington, Del., a corporation of Delaware No Drawing. Application June 16, 1937, Serial No. 148,516

18 Claims. (Cl. 260—17)

This invention relates to coating compositions and the method of applying the same. More particularly, the invention relates to moistureproofing coating compositions for use in moistureproofing non-fibrous cellulosic sheets and films.

Heretofore, it has been known to prepare moistureproofing coating compositions for various purposes wherein the so-called "solid" ingredients (those which form the ultimate coating) are dissolved or dispersed in a suitable, volatile, solvent medium. The coating composition was then applied to the object to be coated, whereupon the solvent medium was removed by evaporation at ordinary or elevated temperatures, thus depositing the "solid" ingredients in the desired fashion. Under such conditions, the art of coating, lacquering, etc. has always been required to provide some means for disposition of the removed solvent. In many instances elaborate means for solvent recovery have been devised while in those cases where recovery was not economical some means for quickly eliminating the solvent laden atmosphere had to be provided to prevent fire, explosion or danger to workmen by inhalation of vapors which may be more or less toxic.

It is therefore an object of this invention to produce a moistureproofing coating composition which is free of volatile solvents at all times.

Another object of the invention is the production of a moistureproofing coating composition which may be deposited on a given base in liquid form and subsequently converted in its entirety to a substantially solid form.

A more specific object of the invention is the production of a moistureproofing coating composition, wherein substantially all of the ingredients of the composition remain as a part of the ultimate coating.

Another object of the invention is the provision of a moistureproof coated material wherein the coating comprises a substantially nonvolatile solvent polymerized in situ.

Another object resides in the production of a moistureproof coated cellulosic sheet material, such as regenerated cellulose wherein the coating comprises a film forming material, such as a resin or cellulose derivative, dissolved in a substantially non-volatile polymerizable solvent which latter is polymerized in situ to form the ultimate coating.

A specific object of the invention is the production of a regenerated cellulose sheeting coated with a moistureproofing composition comprising cyclohexyl methacrylate, a cellulose derivative, a resin or blending agent, a plasticizer and a moistureproofing agent, the cyclohexyl methacrylate being polymerized in situ.

Another object of the invention resides in a method of coating various objects wherein a liquid moistureproofing coating composition is applied and subsequently converted in situ to a smooth, flexible, nontacky, moistureproof transparent coating without the loss of any substantial portion of any of the ingredients of the coating composition.

Other objects of the invention will appear hereinafter.

Generally speaking, the objects of the invention are accomplished by the use of a substantially nonvolatile, polymerizable material which is a solvent for all the ingredients of the moistureproofing coating composition and which may be polymerized in situ to form a homogeneous, flexible, moistureproof, non-tacky adherent coating which is smooth and transparent.

It has previously been proposed, in order to eliminate solvent difficulties, to prepare suitable coating compositions in the form of a melt and apply the molten composition to the base or object to be coated permitting the coating to solidify in situ. It has also been proposed to disperse the coating composition in aqueous or other noninflammable media in order to avoid the hazards attendant on the use of solvents. The present invention differs from such proposals, however, in the use of a polymerizable solvent which will dissolve the other ingredients of a moistureproofing coating composition to form a solution which can be easily applied to a base material. The solvent instead of volatilizing from the composition will polymerize in situ and set up or harden to become an integral part of the final coating.

In accordance with the invention, it has been found that certain polymerizable liquids of low volatility are, in their monomeric form, excellent solvents for the ingredients of moistureproofing coating compositions including waxes or wax-like materials and retain their compatibility with such ingredients after polymerization in the presence thereof.

Moistureproofing coating compositions may be divided conveniently into two large groups: those which contain cellulose derivatives and those which are free of cellulose derivatives. In the latter group it is customary to rely on certain resins, oils (especially drying oils) and the like to serve as the principal film forming ingredients. Other materials including plasticizers, fillers, pigments, dyes or the like may be included, depending on the ultimate intended use for the composition. The former group may comprise the ingredients of the latter group with the addition of suitable amounts of a cellulose derivative such as an ester, ether, mixed ester, mixed ether or mixed ether-ester, due consideration being given to compatibilities and other characteristics. Either type of coating composition is adapted to moistureproofing purposes by including suitable moistureproofing agents and adjusting the proportions of the various ingredients and solvents as taught by such art as is exemplified in Charch & Prindle U. S. Patent No. 1,737,187, and U. S. A. Patent No. 2,147,629 (Charch).

In all of such prior art coating compositions, however, the various ingredients have been dissolved in suitable volatile solvents which had to be removed in the process of converting the coating composition to a final coating.

Although prior art coating compositions have employed polymeric materials, they were always in the polymerized form, dissolved in suitable solvents or diluents. If such materials have been used in monomeric form, they have been polymerized in solution after addition to the coating composition and prior to the application of the composition to the object to be coated. In all cases volatile solvents have been employed and removed during a so-called "drying" operation.

It has now been found in accordance with this invention that certain monomeric, polymerizable, substantially non-volatile liquid materials are capable of dissolving other solids constituents of moistureproofing coating compositions to yield substantially clear, flowable compositions which can be applied to any object to be coated, whereupon the monomeric material may be polymerized in situ to provide a resultant homogeneous film or hardened coating which is generally flexible and non-tacky and may be rendered clear, transparent, moistureproof, opaque, translucent, pigmented, colored or the like, as desired.

Numerous polymerizable liquids which will become firm upon polymerization are available for the practice of the invention, but depending on the type of composition desired, the choice, for certain purposes, may be more or less limited. In order to be commercially practicable, it is preferred that the polymerizable solvents have the following basic requirements:

(a) A sufficiently low volatility at the polymerizing temperature so that the polymerizable material will not be lost from the coating;

(b) A sufficiently slow polymerizing rate at ordinary temperatures, even in the presence of a catalyst, so that the polymerization will not take place prematurely.

(c) A sufficiently fast polymerizing rate at elevated temperatures, such as for example at about 100° C. so that the coating can be quickly set up.

(d) A polymerization product which is clear, hard and non-tacky.

Preferably the material must show good solvent properties for resins, plasticizers, cellulose derivatives, moistureproofing agents, oils, etc. in order that these may be used in the preparation of suitable moistureproofing coating compositions.

Included among the useful materials may be mentioned broadly, vinyl compounds such as esters, ethers, hydrocarbons, for example, ethyl vinyl phthalate, vinyl palmitate and vinyl stearate; derivatives of acrylic acid or its homologues such as esters thereof; members of the indene and coumarone groups or the like. The acrylic acid derivatives, particularly esters of methacrylic acid have been found to be well suited to the practice of the invention. Specifically, it has been found that cyclohexyl methacrylate, methoxyethyl methacrylate, butoxyethoxyethyl methacrylate, butyl methacrylate, isobutyl methacrylate, beta morpholine amino ethyl methacrylate or indene are well suited to the purposes of the invention.

In place of the monomer a partially polymerized resin may be used which is still in the liquid state and which will serve as a solvent for other ingredients in the coating composition.

Among the substances which may serve as ingredients of the coating compositions may be mentioned cellulose derivatives, resins, oils, plasticizers, moistureproofing agents, fillers, pigments, dyes, etc.

As cellulose derivatives the invention contemplates a wide variety of materials including cellulose nitrate, acetate, butyrate, propionate, stearate, aceto-propionate, aceto-nitrate, aceto-stearate, butyrate-nitrate or the like; ethyl, benzyl or methyl cellulose; mixtures of two or more of these derivatives in varying degrees of esterification or etherification commonly recognized as solvent-soluble and known to the art of coating compositions.

As resins there may be included those of the natural or synthetic varieties including rosin, rosin derivatives, damar, copals, alkyd resins of the polyhydric alcohol-polybasic acid type, halogenated diphenyl resins, polymerized vinyl ester or other derivative resins and even polymerized products obtained by the separate polymerization of methacrylic acid derivatives, or indeed interpolymers, etc. Rubber derivatives such as chlorinated rubber, rubber hydrochloride, hydrogenated rubber or resins obtained by treatment of rubber with various chemical reagents including sulfuric acid, chlorostannic acid, tin tetrachloride or the like may also find use.

Numerous plasticizing compounds will be available including certain monomeric methacrylates for example which do not polymerize; certain methacrylates such as naphthenyl or "Lorol" methacrylates which polymerize only to relatively soft resinous masses. Where cellulose derivatives are employed, any of the usual cellulose derivative plasticizers may be used to advantage, such as tricresyl phosphate, dibutyl phthalate, cyclohexyl phthalate, or the like. Mixtures of plasticizers will frequently be more effective than single plasticizers.

As moistureproofing agents suitable waxes or wax-like substances will be selected. These materials will hereinafter be termed "wax materials." Thus, for example, paraffin wax, ceresin, beeswax, dinaphthoxydiethyl ether, ceryl alcohol, dioctadecyl ether, laurone, or the like may be used. In many instances, hardening waxes, such as carnauba or Montan wax may be included. Generally, the preferred moistureproofing agent will be paraffin wax of rather high melting point, say of the order of 60°–62° C.

For the purposes of this specification and claims we define moistureproof materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.25° C.), with a water vapor pressure differential of 50-55 mm. (preferably 53.4 plus or minus 0.7 mm.) of mercury. For convenience, the number of grams of water vapor passed under these conditions may be referred to as "the permeability value." An uncoated sheet of regenerated cellulose having a thickness of approximately 0.0009" will show a permeability value of the order of 6,900.

As illustrative of some of the coating compositions which are capable of moistureproofing action, the following examples are set forth. It is understood that these are not to be considered as in any way limitative of the various compositions which may be formulated for the practice of this invention.

wax referred to in the examples is a commercial mixture of palmityl and stearyl alcohols.

It will be noted in the above examples that a polymerization catalyst, benzoyl peroxide, is included. This is merely exemplary of one of the more convenient means of accelerating polymerization. Any of the well known catalysts may be employed such as other organic peroxides, uranium salts or the like which are capable of catalyzing such polymerizations. In some cases satisfactory polymerization may be accomplished without the use of a catalyst as by simple heating or exposure to light rays, particularly sunlight or light rich in ultra-violet rays, for example, such as is emitted from a mercury vapor lamp or the like.

The compositions herein described are particularly useful in the coating of regenerated cellulose or other cellulosic sheet material such as may be used for wrapping purposes. As exemplary of other cellulosic base materials may be mentioned sheets or films obtained by coagulation or precipitation of cellulosic materials from aqueous or alkaline-aqueous dispersions or solutions, such as glycol cellulose, cellulose glycollic acid, lowly etherified or lowly esterified ethyl, methyl or acetyl celluloses. Likewise, the usual types of cellulose acetate, cellulose nitrate, ethyl, methyl or benzyl cellulose sheets or films as well as sheets of mixed cellulose esters or ethers or ether-esters may be employed as the base to be coated. Sheets or films of rubber, rubber hydrochloride, gelatin, casein may be coated if desired.

Thus, for example, sheets of regenerated cellulose may be immersed in a coating composition such as is set forth in Table I, removed from the solution, subjected to a scraping operation to remove the excess composition and leave a uniform surface coating, and then placed in an oven at about 100° C. In a few minutes (1 to 5), the

*Table I*

| Ingredients (parts expressed by weight) | Ex. I | Ex. II | Ex. III | Ex. IV | Ex. V | Ex. VI | Ex. VII | Ex. VIII | Ex. IX | Ex. X | Ex. XI | Ex. XII | Ex. XIII |
|---|---|---|---|---|---|---|---|---|---|---|---|---|---|
| Indene | 50.0 | | | | | | | | | | | | |
| Normal butyl methacrylate | | 25.0 | | | | | | | | | | | |
| Isobutyl methacrylate | | | 50.0 | 50.0 | | | | | | | | | |
| Methoxyethyl methacrylate | | | | | 50.0 | 50.0 | | | | | | | |
| Butoxyethoxyethyl methacrylate | | | | | | | 50.0 | | | | | | |
| Ethoxyethyl methacrylate | | | | | | | | 50.0 | 50.0 | | | | |
| Cyclohexyl methacrylate | | | | | | | | | | 25.0 | 50.0 | 50.0 | 52.0 |
| Nitrocellulose | | | | | | 3.0 | 3.0 | 3.0 | 3.0 | | | 3.0 | 3.0 |
| Ethyl cellulose | | | | 2.0 | | | | | | | | | |
| Dewaxed damar | | 3.0 | | 4.5 | 7.0 | | | | | | | | |
| Modified rosin | | | | | | 3.0 | 3.0 | | 6.0 | | | 3.0 | 5.0 |
| Hydrogenated ester gum | | | | | | | | 3.0 | | | | | |
| Dibutyl phthalate | | | | 1.0 | | 0.5 | 0.5 | 0.3 | 0.8 | | | 0.5 | 1.5 |
| Paraffin wax | 0.5 | 0.2 | ¹2.0 | ¹2.0 | 1.6 | 0.7 | 0.5 | 0.5 | 0.7 | 0.2 | 0.5 | 0.5 | 0.5 |
| Lanette wax | | | | | | | | | | 0.5 | | | |
| Benzoyl peroxide | 0.5 | 0.3 | 0.4 | 0.4 | 0.4 | 0.5 | 0.5 | 0.5 | 0.5 | 0.3 | 0.5 | 0.5 | 0.5 |
| Appearance | Good | Sl. haze | Sl. blush | Haze | Good | Good | Blush | Good | Good | Good | Good | Good | Good |
| Permeability value | 875 | 400 | 8 | 65 | 7 | 4 | 65 | 400 | 8 | 600 | 240 | 40 | 4 |

¹ Introduced as a 20% solution in toluene.

In Table I the nitrocellulose used was that manufactured by the Hercules Powder Company and sold as Hercules RS Nitrocellulose, 12.2% N. Any other low viscosity nitrocellulose such as is commonly employed in lacquer type coating compositions will serve satisfactorily although it is preferable that an approximately equal nitrogen content be selected.

The resin described in the table as "modified rosin" is obtained by treating wood rosin with sulfuric acid under conditions described in U. S. Patent No. 2,017,866 to Morton. The "Lanette"

sheets may be removed from the oven when it will be found that they have a smooth, flexible, non-tacky coating which is generally clear, transparent and possesses a high degree of moistureproofness.

If desired, the coating can be applied in continuous fashion to a long sheet of material such as regenerated cellulose film in which case the film is led from a supply roll over suitable guide rolls into a tank containing a suitable composition as described. The film, having been immersed in the solution and thus coated on both sides, is then led between suitable doctoring devices such as knives, rolls, scraper rods or the like to remove excess composition and deposit a uniform layer of coating material. The coated film is then led into a heated chamber where it is maintained out of contact with rolls or other apparatus which would mar the surface until the polymerization of the solvent medium has taken place when it can be led out of the chamber over suitable guide rolls, cooled and finally wound into a large supply roll for further handling, cutting, distribution, etc. Obviously, the coating can be applied to one or both sides of the film by suitable choice of method of application as by spraying, transfer rolls, dip rolls, brushes, flowing or the like.

It will be understood readily that these compositions may be cast in the form of self-sustaining sheets or films in accordance with the general procedure and technique common to the casting of cellulose derivative (cellulose acetate or nitrate) films by the so-called "dry process" or they may be spun into threads, filaments, etc.

The compositions and method of this invention are particularly suited to the moistureproofing of regenerated cellulose film destined for use as wrapping tissue. This is especially true since the coating on the finished film can be sealed by simple application of organic solvents such as ethylene glycol mono-methyl ether or acetone, or, if desired, a coating readily sealable by application of heat and light pressure may be prepared. Example IV of Table I is illustrative of a heat sealable composition. In wrapping tissues where considerable flexing is frequently met, good adhesion of the coating to the base is required in order that the coating will not flake off. Compositions of the present invention show good adhesion. As is well known, regenerated cellulose is moisture sensitive and when coated films are subjected to liquid water, there is a tendency for the coating to separate from the base. This characteristic is noticed to a somewhat lesser degree in the coated product of this invention, but the "anchorage" against the detrimental action of liquid water may be accomplished readily by interposing an anchor layer or coating as described in United States Letters Patent No. 1,962,338 to Charch; No. 1,972,869 to Charch, Hyden and Siemann; No. 1,990,080 to Leach and Siemann; No. 2,030,962 to Charch, Hyden and Siemann; or by the use of any other anchoring composition.

As an alternative method for the moistureproofing of regenerated cellulose film, for example, the gel film—that is, as it is obtained in the purified but undried condition—can be treated with suitable solvents to remove and displace the water whereupon the solvents can be displaced by the monomeric polymerizable solvent and the material then impregnated with a modification of one of the above-described coating compositions, due adjustment having been made for the polymerizable solvent already present in the sheet. Subsequent heat treatment will provide for polymerization of the substantially non-volatile solvent to produce a material which is not only coated but impregnated with the hardened composition.

The natural incompatibility of many polymerized substances, even those which may be obtained by polymerizing the polymerizable solvents of this invention, prevents their use in coating compositions of this general character and particularly compositions containing moistureproofing agents when attempts are made to incorporate the polymerized form into mixtures employing volatile solvents as the medium for applying the compositions. Thus, for example, it will be noted from Table I that the composition of Example XIII prepared and applied to regenerated cellulose film in accordance with this invention will produce a coated film with a very high degree of moistureproofness (permeability value of 4). If, however, the cyclohexyl methacrylate be separately polymerized and then brought into solution with the other ingredients by means of a solvent mixture containing 65% ethyl acetate and 35% toluene to form a solution containing about 12% solids and this solution is used to coat regenerated cellulose film, a non-moistureproof product will be obtained (permeability value 6,500). In many instances incompatibilities result in harmful haziness, non-moistureproofness, stickiness, roughness of surface or the like. By employing the substantially, non-volatile, polymerizable solvent and polymerizing in situ, these difficulties, formerly insurmountable, are easily overcome.

It will be apparent that the compositions and method of this invention will be useful for many purposes where protection against water, moisture vapor, oil, grease and other influences is desired. The coating compositions and methods of application of the present invention are particularly desirable because of the elimination of volatile solvents with all the attendant hazards of fire, explosion, toxicity, odor, solvent recovery or incompatibilities. The drying equipment is simplified so that instead of providing forced draft or circulating heated air streams to remove the volatile solvents rapidly, it is merely necessary to provide radiant heat, thereby reducing the costs of installation, maintenance and operation, as well as reducing the size of plant required by elimination of all the space formerly required for the handling of solvents before, during and after the coating operations.

Since many obvious changes and modifications can be made in the compositions and methods hereinabove described without departing from the nature and spirit of the invention, it is to be understood that the invention is not to be limited except as set forth in the following appended claims.

I claim:

1. A composition comprising essentially 3 parts nitrocellulose, 5 parts modified rosin, 1.5 parts dibutyl phthalate, 0.5 part paraffin wax, 0.5 part benzoyl peroxide and 52 parts cyclohexyl methacrylate.

2. The process of preparing transparent, flexible, moistureproof regenerated cellulose which comprises coating regenerated cellulose film with the composition of claim 1, and thereafter causing polymerization of the cyclohexyl methacrylate.

3. The transparent, flexible, moistureproof, regenerated cellulose sheet obtained by coating a regenerated cellulose sheet with the composition of claim 1 and causing polymerization of the cyclohexyl methacrylate.

4. The process of moistureproofing a non-fibrous base sheet or film which comprises dissolving the "solid ingredients of a moistureproofing composition in a polymerizable solvent which will become firm as a result of polymerization thereof, said solvent being substantially non-volatile at the polymerizing temperature, the said solution being liquid at ordinary temperatures, applying, in the absence of a volatile solvent, said solution to said base, and polymerizing said solvent in situ.

5. The process of moistureproofing a non-fibrous base sheet or film which comprises dissolving the "solid" ingredients of a moistureproofing composition in a polymerizable solvent which will become firm as a result of polymerization thereof, said solvent being substantially non-volatile at the polymerizing temperature, the said solution being liquid at ordinary temperatures, the said "solid" ingredients of the composition comprising essentially a film-forming material and a moistureproofing material, applying, in the absence of a volatile solvent, said solution to said base, and polymerizing said solvent in situ.

6. The process of moistureproofing a non-fibrous base sheet or film which comprises dissolving the "solid" ingredients of a moistureproofing composition in a polymerizable solvent which will become firm as a result of polymerization thereof, said solvent being material containing the vinylene

radical, which material is substantially non-volatile at the polymerizing temperature, the said solution being liquid at ordinary temperatures, the said "solid" ingredients of the composition comprising essentially a film-forming material and a moistureproofing material, applying, in the absence of a volatile solvent, said solution to said base, and polymerizing said solvent in situ.

7. The process of moistureproofing a non-fibrous base sheet or film which comprises dissolving the "solid" ingredients of a moistureproofing composition in a polymerizable solvent which will become firm as a result of polymerization thereof, said solvent being polymerizable acrylate which is substantially non-volatile at the polymerizing temperature, the said solution being liquid at ordinary temperatures, the said "solid" ingredients of the composition comprising essentially cellulosic film-forming material and wax moistureproofing material, applying, in the absence of a volatile solvent, said solution to said base, and polymerizing said slovent in situ.

8. The process of moistureproofing a non-fibrous base sheet or film which comprises dissolving the "solid" ingredients of a moistureproofing composition in a polymerizable solvent which will become firm as a result of polymerization thereof, said solvent being polymerizable methacrylate which is substantially non-volatile at the polymerizing temperature, the said solution being liquid at ordinary temperatures, the said "solid" ingredients of the composition comprising essentially cellulose nitrate film-forming material and paraffin wax moistureproofing material, applying, in the absence of a volatile solvent, said solution to said base, and polymerizing said solvent in situ.

9. The process of moistureproofing a non-fibrous base sheet or film which comprises dissolving the "solid" ingredients of a moistureproofing composition in a polymerizable solvent which will become firm as a result of polymerization thereof, said solvent being polymerizable cyclohexyl methacrylate which is substantially non-volatile at the polymerizing temperature, the said solution being liquid at ordinary temperatures, the said "solid" ingredients of the composition comprising essentially a film-forming material and a moistureproofing material, applying, in the absence of a volatile solvent, said solution to said base, and polymerizing said solvent in situ.

10. The process of moistureproofing a non-fibrous base sheet or film which comprises dissolving the "solid" ingredients of a moistureproofing composition in a polymerizable solvent which will become firm as a result of polymerization thereof, said solvent being polymerizable methoxyethyl methacrylate which is substantially non-volatile at the polymerizing temperature, the said solution being liquid at ordinary temperatures, the said "solid" ingredients of the composition comprising essentially a film-forming material and a moistureproofing material, applying, in the absence of a volatile solvent, said solution to said base, and polymerizing said solvent in situ.

11. The process of moistureproofing a non-fibrous base sheet or film which comprises dissolving the "solid" ingredients of a moistureproofing composition in a polymerizable solvent which will become firm as a result of polymerization thereof, said solvent being polymerizable butoxyethoxyethyl methacrylate which is substantially non-volatile at the polymerizing temperature, the said solution being liquid at ordinary temperatures, the said "solid" ingredients of the composition comprising essentially a film-forming material and a moistureproofing material, applying, in the absence of a volatile solvent, said solution to said base, and polymerizing said solvent in situ.

12. A volatile, solvent-free moistureproofing coating composition which is liquid at ordinary temperatures, and which comprises essentially a film-forming material and a moistureproofing material dissolved in a polymerizable solvent which will become firm as a result of the polymerization thereof, the said solvent being substantially non-volatile at the polymerizing temperature.

13. A volatile, solvent-free moistureproofing coating composition which is liquid at ordinary temperatures, and which comprises essentially a film-forming material and a moistureproofing material dissolved in a polymerizable solvent which becomes firm as a result of the polymerization thereof, the said solvent being material containing the vinylene

radical, which material is substantially non-volatile at the polymerizing temperature.

14. A volatile, solvent-free moistureproofing coating composition which is liquid at ordinary temperatures, and which comprises essentially cellulosic film-forming material and a wax moistureproofing material dissolved in a polymerizable acrylate solvent which will become firm as a result of the polymerization thereof, said solvent being substantially non-volatile at the polymerizing temperature.

15. A volatile, solvent-free moistureproofing coating composition which is liquid at ordinary temperatures, and which comprises essentially cellulose nitrate film-forming material and paraffin wax moistureproofing material dissolved in a polymerizable methacrylate solvent which become firm as a result of the polymerization thereof, said solvent being substantially non-volatile at the polymerizing temperature.

16. A volatile, solvent-free moistureproofing coating composition which is liquid at ordinary temperatures, and which comprises essentially a film-forming material and a moistureproofing material dissolved in a polymerizable solvent which will become firm as a result of the polymerization thereof, the said solvent being polymerizable cyclohexyl methacrylate which is substantially non-volatile at the polymerizing temperature.

17. A volatile, solvent-free moistureproofing coating composition which is liquid at ordinary temperatures, and which comprises essentially a film-forming material and a moistureproofing material dissolved in a polymerizable solvent which will become firm as a result of the polymerization thereof, the said solvent being polymerizable methoxyethyl methacrylate which is substantially non-volatile at the polymerizing temperature.

18. A volatile, solvent-free moistureproofing coating composition which is liquid at ordinary temperatures, and which comprises essentially a film-forming material and a moistureproofing material dissolved in a polymerizable solvent which will become firm as a result of the polymerization thereof, the said solvent being polymerizable butoxyethoxyethyl methacrylate which is substantially non-volatile at the polymerizing temperature.

JAMES A. MITCHELL.